Patented Dec. 1, 1936

2,062,504

UNITED STATES PATENT OFFICE 2,062,504

PROCESS FOR IMPROVING THE WETTING OUT PROPERTIES OF MATERIALS

Cecil Chapman, Pinner, England, assignor to Monsanto Chemicals Limited, London, England, a British company No Drawing. Application December 4, 1934, Serial No. 756,008. In Great Britain December 12, 1933

6 Claims. (Cl. 252—1)

The invention consists in improvements in or relating to the treatment of materials to improve their wetting out properties.

It has been found that materials for example textile articles, e. g. handkerchiefs, towels and surgical dressings, and articles which are made of unwoven vegetable fibres, e. g. cotton wool, paper and pulp as ordinarily manufactured show a certain resistance to wetting by water or aqueous fluids so that the absorptive properties of the materials do not take effect at a convenient speed.

It is an object of the present invention to treat materials in order to increase their speed of absorption.

According to the present invention a method of treating materials, particularly textile fibres and articles, to improve their absorbent properties comprises impregnating the materials with a homologue of phenol having a halogen as a substituent in the ring, for example 2-chlor-5-hydroxy-toluene or 4-chlor-1-hydroxy-3-5-dimethyl benzene.

Materials may be impregnated during the course of their manufacture, or manufactured articles may be impregnated or the impregnation may be effected even when laundering used articles.

By impregnating the materials I mean treating them in such a manner that the substances to be used according to the invention are brought into intimate contact with the materials, for example by immersing the material in a solution of the substance. I do not know whether the substance actually enters the fibres of the materials or merely remains on the surface. The halogen substituted homologues of phenol are soluble in water to a small extent, for example 2-chlor-5-hydroxy-toluene is soluble in water to the extent of about 1 part in 200 at ordinary temperatures and in the preferred method of carrying out the invention the materials are impregnated by means of a saturated aqueous solution of one of the substances.

In one example of the method according to the invention, cotton wool was immersed in an 0.4% aqueous solution of 2-chlor-5-hydroxy-toluene and thoroughly soaked with the solution, it was then removed, wrung out and dried. It was found that the treated cotton wool absorbed water far more quickly than untreated cotton wool and, moreover, as a result of its treatment possessed valuable antiseptic germicidal and deodorant properties.

In order to demonstrate the improved absorptive properties conferred by the method of treatment in accordance with the present invention the following test was carried out:

A sample of cotton wool as commercially produced for surgical and other uses was divided into three equal portions. One was soaked in water, one in 0.4% aqueous solution of 2-chlor-5-hydroxy-toluene, and one in a 1% solution of a commercial "wetting out agent". All three portions were then wrung out and dried, and were tested by dropping onto the surface of clean water. The first portion floated for several hours without being wetted by the water, the third portion floated for a few minutes before becoming wet and sinking, but the second portion (i. e. the portion treated in accordance with the present invention) sank immediately.

It is to be understood that while the invention is described specifically with regard to vegetable fibres and textile articles produced therefrom, it is applicable to other vegetable materials, such as wood flour, also to animal fibres and materials (e. g. leather) and to porous inorganic materials that is to say to any material having absorptive properties which it is desired to improve.

I claim:

1. A method of treating absorbent materials to improve their absorbent properties comprising impregnating the materials with 2-chlor-5-hydroxy toluene in the absence of other organic compounds.

2. A method of treating absorbent materials to improve their absorbent properties comprising impregnating the materials with 4-chlor-1-hydroxy-3-5-dimethyl benzene in the absence of other organic compounds.

3. Textile material having strong absorbent properties and impregnated only with 2-chlor-5-hydroxy-toluene.

4. Textile material having strong absorbent properties and impregnated only with 4-chlor-1-hydroxy-3-5-dimethyl-benzene.

5. Cotton wool having strong absorbent properties and impregnated only with 2-chlor-5-hydroxy-toluene.

6. A method of treating absorbent materials to improve their absorbent properties which comprises impregnating the material in the absence of other organic compounds with a compound selected from the group consisting of 2-chlor-5-hydroxy-toluene and 4-chlor-1-hydroxy-3-5-dimethyl benzene.

CECIL CHAPMAN.